United States Patent [19]
Cox

[11] Patent Number: 4,873,824
[45] Date of Patent: Oct. 17, 1989

[54] MASTER CYLINDER PRESSURE-RETAINING VEHICULAR ANTI-THEFT BRAKE LOCKING MECHANISM

[76] Inventor: Terry L. Cox, 9510 Westpark Houston, Tex. 77063

[21] Appl. No.: 13,953

[22] Filed: Feb. 12, 1987

[51] Int. Cl.[4] ............................................. F15B 15/26
[52] U.S. Cl. ....................................... 60/545; 60/570; 188/265; 92/18; 92/2
[58] Field of Search ................... 60/568, 570, 593, 545; 92/20, 28, 18, 23, 27; 188/62, 265, 353

[56] References Cited

U.S. PATENT DOCUMENTS

| Re. 29,913 | 2/1979 | Case et al. | 92/24 |
|---|---|---|---|
| 2,065,176 | 12/1936 | Engel | 188/353 |
| 2,106,304 | 1/1938 | McGee | 60/570 |
| 2,274,304 | 2/1942 | Perry | 188/67 X |
| 2,491,259 | 12/1949 | Funderburg | 188/67 X |
| 2,500,502 | 3/1950 | Vogel | 188/265 X |
| 2,541,312 | 2/1951 | Vogel | 188/265 X |
| 2,873,579 | 2/1959 | Safford | 188/67 X |
| 3,482,666 | 12/1969 | Case et al. | 188/265 |
| 3,515,442 | 6/1970 | Whittemore | 303/89 |
| 3,617,100 | 11/1971 | Wrigley et al. | 188/353 |
| 3,625,573 | 12/1971 | Conn | 188/353 |
| 3,653,730 | 4/1972 | Cvetkovich | 188/353 |
| 3,874,747 | 4/1975 | Cast et al. | 92/24 |
| 3,973,803 | 8/1976 | Seward et al. | 188/353 |
| 4,007,815 | 2/1977 | Acre | 188/265 |
| 4,040,675 | 8/1977 | Richmond et al. | 188/353 |
| 4,103,280 | 7/1978 | Cholet | 92/20 |
| 4,116,113 | 9/1978 | Leclerc | 188/265 X |
| 4,270,355 | 6/1981 | Green | 60/593 |
| 4,307,570 | 12/1981 | Yardley | 60/593 |
| 4,534,269 | 8/1985 | Scerbo et al. | 92/27 X |
| 4,619,188 | 10/1986 | Kimura | 92/27 X |

FOREIGN PATENT DOCUMENTS

2436059 2/1976 Fed. Rep. of Germany ........ 60/570

Primary Examiner—Robert E. Garrett
Assistant Examiner—George Kapsalas
Attorney, Agent, or Firm—Daniel N. Lundeen

[57] ABSTRACT

A brake locking mechanism of the anti-theft type for use with an automobile vehicular brake system having one or more fluid operated brakes, a master cylinder and an actuator for reciprocating a piston in the cylinder to apply and release the brakes. The locking mechanism has a housing adapted to fit between the master cylinder and the actuator, means such as a ratcheted rod within the housing for reciprocating the piston responsively to the actuator, and means such as a pawl operatively associated with the ratcheted rod for locking the reciprocating means with the piston in the brake applying position. The locking means is remotely controlled from a keyed or combination lockable control mechanism located in the driving compartment of the vehicle which may be mechanical or electronic.

19 Claims, 7 Drawing Sheets

MASTER CYLINDER PRESSURE-RETAINING VEHICULAR ANTI-THEFT BRAKE LOCKING MECHANISM

BACKGROUND OF THE INVENTION

1. Field of the Invention

This invention relates to vehicular brake locking mechanisms, and particularly to such brake locking mechanisms for impeding theft of the vehicle.

2. Description of the Prior Art

Brake locking mechanisms to deter or impede theft of vehicles such as automobiles, trucks, trailers and the like are well known. However, such mechanisms heretofore known have had one or more disadvantages. For example, in U.S. Pat. Nos. 3,482,666; 3,874,747; 4,007,815; and Re. 29,913; a brake locking mechanism is installed at each brake to prevent movement of an otherwise hydraulically or pneumatically operated brake rod mechanism. This involves installation of a brake locking device at each brake, generally modifying each existing brake to accommodate the locking mechanism, and installing an auxiliary control system to operate the brake locking mechanism.

Another type of brake locking mechanism involves positioning a valve in the brake power fluid line between the master cylinder and the brakes as seen in U.S. Pat. Nos. 4,040,675; 3,973,803; 3,653,730; 3,625,573; 3,617,100; and 3,515,442. With this mechanism, the brakes are locked in the applied position by pressurizing the brake fluid and then closing the valve in the brake fluid line to prevent release of the pressure. However, this type of mechanism has the disadvantage that installation in an existing brake system is complicated by the necessity of breaking the hydraulic fluid line. Further, it is generally a possibility in such systems that the valve in the brake line could close during operation of the vehicle, and thereby render the brakes inoperable while the vehicle is in motion.

It is an object of the present invention to provide a brake locking mechanism which does not require a separate installation at each brake or breaking any brake fluid lines for installation, and further which does not interfere with the normal operation of the brakes while the vehicle is in motion.

SUMMARY OF THE INVENTION

The present invention provides a brake locking mechanism for use with a vehicular brake system having one or more fluid operated brakes, a cylinder for pressurizing the brake fluid, and an actuator for reciprocating a piston in the cylinder in one direction to apply the brakes and in another direction to release the brakes. Briefly, the mechanism includes a housing adapted to securely fit between the actuator and the cylinder, means within the housing for reciprocating the piston responsively to the actuator, and means for releasably locking the reciprocating means with the piston in the brake-applying position.

In another aspect, the invention provides a brake locking mechanism for use in a vehicular braking system having a plurality of fluid operated brakes, a master cylinder with a reciprocatable piston moveable between a brake applying position in which the brake fluid is pressurized and a brake releasing position in which the brake fluid is depressurized, and an actuator for reciprocating the piston operable from within a driver's compartment of the vehicle. The mechanism comprises a housing adapted to fit between the actuator and the cylinder, a bore formed in the housing, a ratcheted rod slideable in the bore and operable to reciprocate the piston responsively to the actuator, and a pawl disposed in the housing for releasably engaging the ratchet to lock the rod in the brake-applying position, thereby rendering the rod nonresponsive to the actuator. The pawl may be released, for example, by a keyed switch or engaging mechanism mounted in the driver's compartment which can be operated only with the proper key.

DETAILED DESCRIPTION OF THE PREFERRED EMBODIMENTS

Figure 1:
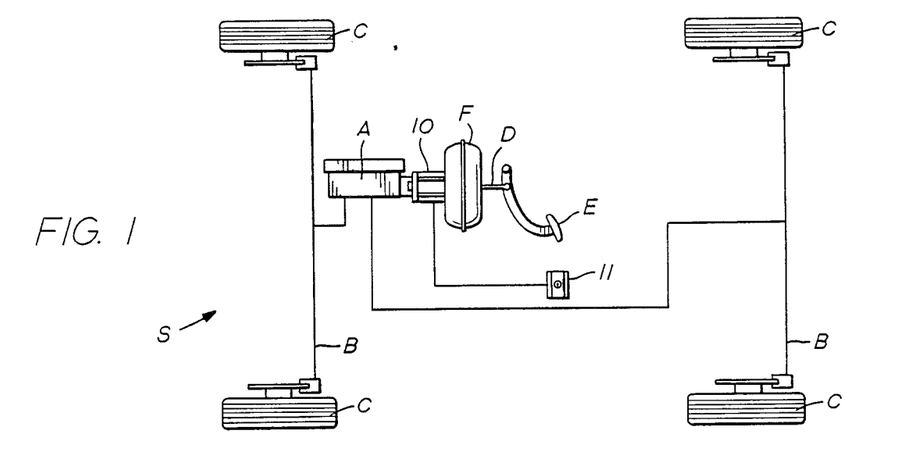
FIG. 1 is a schematic illustration of an embodiment of a vehicular brake system having a brake locking mechanism according to the present invention.

As seen in FIG. 1, a vehicular braking system S includes master cylinder A, brake fluid lines B, and brakes C. The master cylinder A is typically operated by means of a rod D which is responsive to foot pedal E. Rod D is typically installed to make the operation of the master cylinder A responsive thereto, directly in the case of a standard brake system, or with the aid of a power booster F in the case of power brakes. According to the present invention, a locking mechanism 10 is positioned between the actuator F and the master cylinder A. The locking mechanism 10 is remotely operable by a locking device 11 mounted, for example, on the dashboard of the vehicle passenger compartment.

As seen in FIGS. 2, 3, 6 and 7, the conventional master cylinder A has a bore 12 formed therein which receives a piston 14 having seal means 16,18 therebetween. The piston 14 is reciprocatable to compress and decompress the brake fluid for operating the brakes. The master cylinder A has an extended portion 20 which fits into a corresponding recess 22 formed in the typical power booster F in conventional brake systems when the locking mechanism 10 is not present. The power booster F typically has a housing 24, diaphragm 26, vacuum chamber 28, hydraulic push rod 30, seal 32, reaction disk 34 and valve operating rod assembly 36 (shown only in part) which is operatively connected with the foot pedal E. When the locking mechanism 10 is not employed, the end 38 of the push rod 36 engages the piston 14 in the centrally disposed recess 40 formed therein. Movement of the push rod 36 is thus responsive to the foot pedal E and reciprocates the piston 14 to operate the brakes.

According to the present invention, the locking mechanism 10 is disposed between the master cylinder A and the power booster F or other conventional apparatus for reciprocating the piston 14 as may be present. Referring to FIGS. 2-7, the locking mechanism 10 has a housing 50 with a first end 52 adapted to engage the conventional reciprocating apparatus and a second end 54 adapted to engage the master cylinder A. In the illustrated embodiment, the end 52 is an extended portion of dimension similar to the extended portion 20 of the master cylinder A which is thus receivable in the corresponding recess 22 of the power booster F. The second end 54 includes an enlarged bore dimensioned to correspond similarly to the recess 22 so that the extended portion 20 of the master cylinder A may be received therein.

Figure 2:
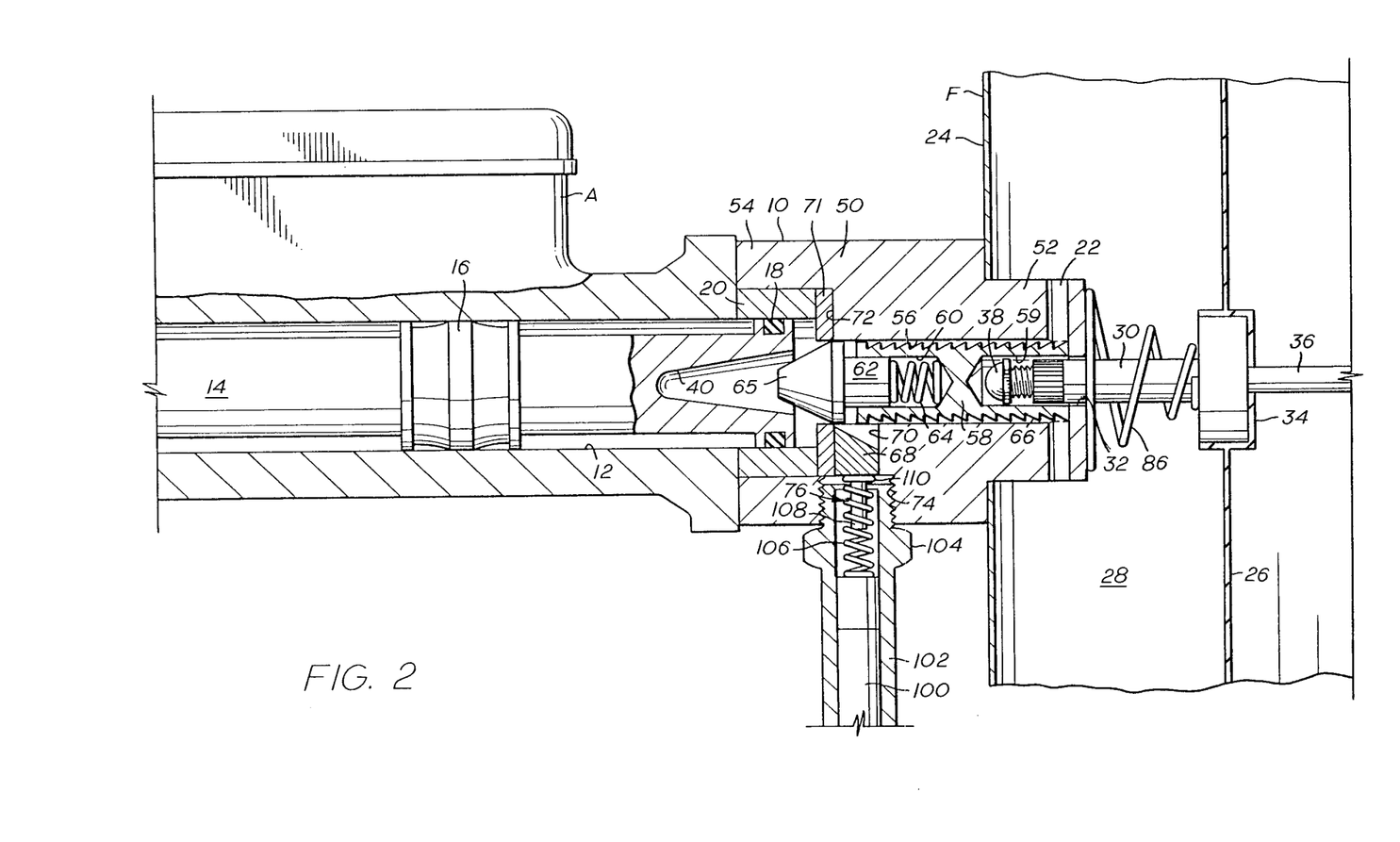
FIG. 2 is a side sectional view of an embodiment of a brake locking mechanism of the present invention installed between a master cylinder and an actuator therefor in the unlocked position.
Figure 3:
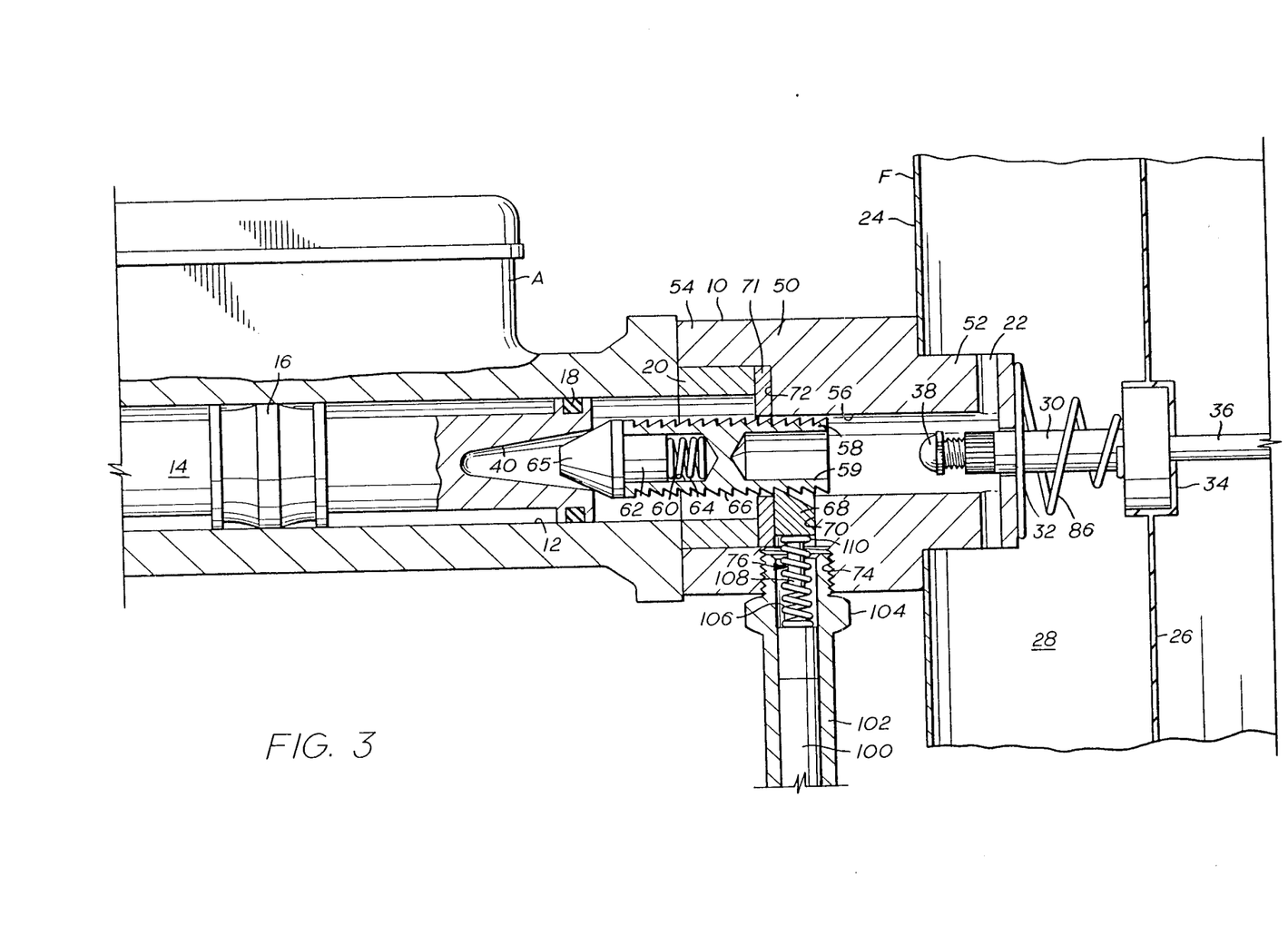
FIG. 3 is a side sectional view of the brake locking mechanism of FIG. 2 in the locked position.

A bore 56 is formed longitudinally through the housing 50 and has a ratcheted transfer rod 58 positioned slidably therein. The rod 58 has a first central longitudinal recess 59 formed therein for engagement by the end 38 of the push rod 36. At the opposite end of the rod 58, there is formed another central longitudinal recess 60 in which a transfer pin 62 is positioned and biased by spring 64. The transfer pin 62 extends from the recess 60 and has a head 65 in engagement with the piston 14 in the recess 40 formed therein.

The rod 58 is provided with ratchet teeth 66 along the longitudinal exterior surface thereof. A pawl member 68 is positioned in a recess 70 at the end 54 adjacent the bore 56 and rod 58 therein. The pawl member 68 may have any suitable shape, but is shown in the preferred shape of a semicircular annulus or washer. The pawl 68 is held in place by a retaining element 71 which is illustrated as a washer disposed between the extended portion 20 of the master cylinder A and the inside face 72 of the enlarged bore 54 formed in the housing 50. A transverse bore or port 74 is formed in the housing 50 to receive a pawl actuator 76 which is described in more detail hereinbelow.

Figure 4:
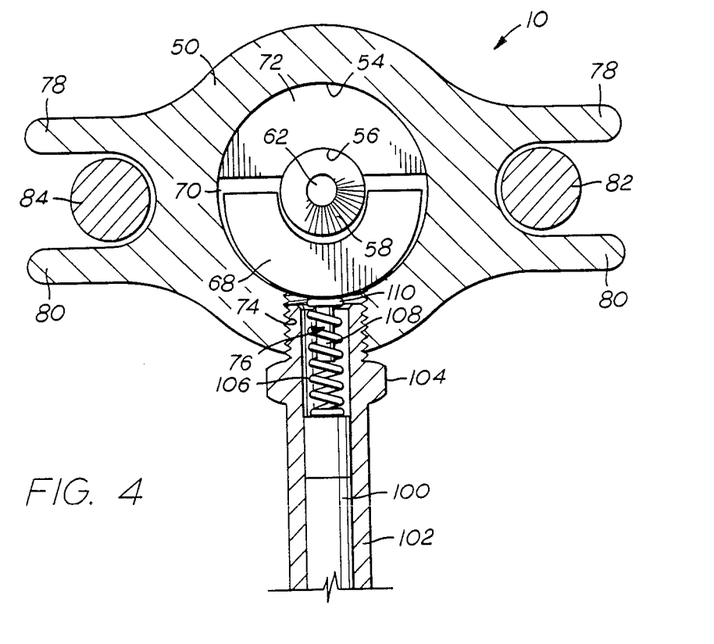
FIG. 4 is a cross-sectional view of the brake locking mechanism of FIG. 2 as seen along the lines 4-4.
Figure 5:
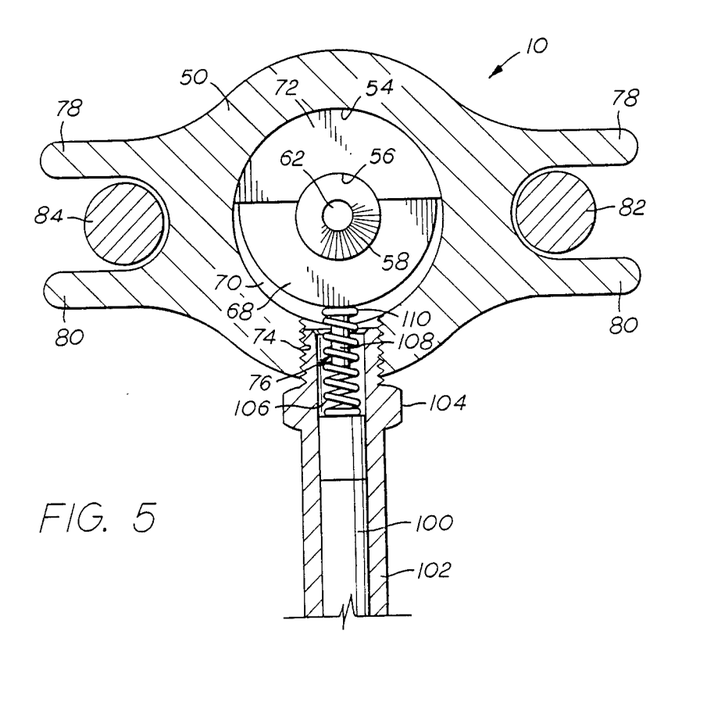
FIG. 5 is a cross-sectional view of the brake locking mechanism of FIG. 3 as seen along the lines 5-5.

The brake locking mechanism 10 is readily installed in most conventional vehicular brake systems by disconnecting the master cylinder A from the power booster F, or other brake actuating mechanism, placing the mechanism 10 therebetween and reattaching the master cylinder A to the power booster F with the mechanism 10 thereby secured interposed between the master cylinder A and the power booster F. Typically, the master cylinder A is secured to the power booster F by two bolts which are easily removed and replaced with longer bolts to accommodate the longitudinal dimension of the housing 50. As seen in FIGS. 4 and 5, the housing has a pair of opposed longitudinal flanges 78,80 on either side thereof for receiving the bolts 82,84. Alternatively, peripheral longitudinal bores could be formed in the housing 50 for this purpose. It is also desirable to insert a push rod return spring 86 in the power booster F to prevent disengagement of the push rod 30 from the reaction disk 34.

In normal operation of the brake system, the piston 14 is reciprocated responsively to the foot pedal E and push rod 36 by transfer of force from the end 38 of the push rod 36 through the rod 58 and spring-biased pin 62 to the piston 14. When it is desired to lock the brakes, the pawl 68 is pushed radially inward against the rod 58 by the pawl actuator 76. Then the brake pedal E is depressed by the vehicle operator which pushes the push rod 36 and rod 58 to reciprocate the piston 14 into the brake applying piston. The pawl 68 engages the teeth 66 preventing retraction of the rod 58, and the piston 14 is held securely in the brake applying position. If the brake fluid expands or contracts due to temperature changes thereof, the brakes remain applied because of the biasing of the pin 62 by the spring 64. In this manner, the vehicle cannot be driven without disengaging the pawl actuator 76 which may be controlled by a locked and/or hidden control mechanism. When the operator desires to disengage the brake lock 10, the pawl actuator 76 is disengaged from the pawl 68 and the pawl 68 is retracted so that the rod 58 may move freely in the bore 56 and the brakes operated normally. In some embodiments, the brake pedal E may have to be depressed following disengagement of the pawl actuator 76 in order to release the pawl 68 from the ratchet 66.

The pawl actuator 76 may be mechanically or electrically operated by a remote mechanism or switch which is desirably hidden and/or locked with a key or combination, for example, to deter or impede unauthorized use of the vehicle. In FIGS. 2-5 and 8-10, there is shown a keyed, mechanically operated embodiment of the pawl actuator 76. In this embodiment, a rod or cable 100 runs from the transverse bore 74 in the housing 50 to a remote location, such as, for example the dashboard or another convenient location of the vehicle operating compartment. The cable 100 is provided with a sleeve 102 connected to the housing 50 at the bore 74 by means of the nipple 104 in threaded engagement therewith. At the end of the cable 100, there is desirably provided a spring 106 for biasing the pawl 68, and a pin 108 disposed longitudinally in the spring 106 having a head 110 adjacent the pawl 68. The pin 108 thus prevents the spring 106 from being overcompressed. The spring 106 also facilitates engagement of the pawl 68 by allowing for some limited movement thereof as the pawl 68 rises over the teeth 66 during travel of the rod 58 during the locking thereof.

Figure 8:
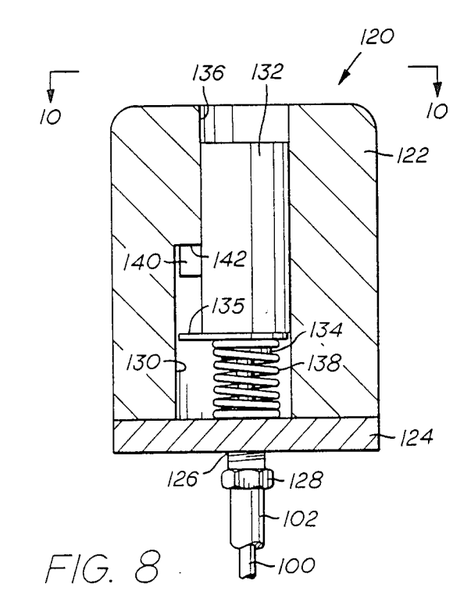
FIG. 8 is a side sectional view of a remote locking device for operation of the brake locking mechanism of the invention, shown in the locked position.
Figure 9:
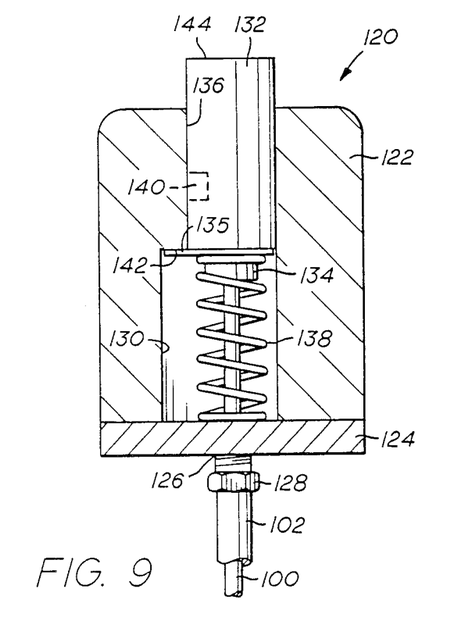
FIG. 9 is a side sectional view of the locking device of FIG. 8, shown in the unlocked position.
Figure 10:
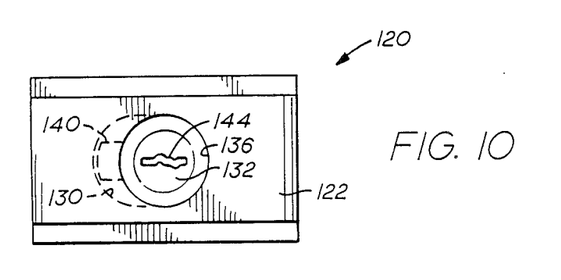
FIG. 10 is an end view of the locking device of FIGS. 8 and 9 as seen along the lines 10-10.

The remote end of the cable 100 and sleeve 102 is preferably connected to a lockable, keyed push button device or barrel lock 120 of a well known type as illustrated in FIGS. 8-10. The barrel lock 120 includes a housing 122 mounted on the dashboard of the vehicle (not shown) by means of screws or bolts, or the like (not shown). The sleeve 102 is attached at an end plate 124 having a port 126 for receiving a threaded nipple 128 securing the sleeve 102 thereto. The cable 100 extends through the nipple 128 and port 126 into an enlarged bore 130 formed in the housing 122 where it is securely attached to a cylinder 132 by means of, for example, a threaded connector 134 on bottom cylinder plate 135. The bottom cylinder plate 135 has a transverse dimension corresponding to the enlarged bore 130, while the cylinder 132 has a transverse dimension corresponding to the bore 136. The cylinder 132 is slideable in the enlarged bore 130 and the reduced bore portion 136, and is biased by spring 138. The cylinder 132 has a spring-biased catch member 140 which is extended from the cylinder 132 when the cylinder 132 is depressed into the bore 130,136 to engage a face 142, thereby preventing retraction of the cylinder 132 from the bore 130,136. The catch member 140 is retractable to the cylinder 132 by means of a key inserted into the cylinder 132 in a keyhole 144 formed therein.

In operation, the barrel lock 120 engages the pawl 68 by depression of the cylinder 132 by the vehicle operator. The cylinder 132 pushes the cable 100 to bias the pawl 68 with the spring 106 for locking of the rod 58 as described above. The cylinder 132 is locked in the depressed position by the extension of catch member 140 into engagement with the face 142. When it is desired to unlock the brakes and return them to normal operation, a key is inserted into the keyhole 144 of the cylinder 132 and turned to retract the catch member 140 into the cylinder 132. The spring 138 pushes the cylinder 132 to the top of the bore 136 with the bottom cylinder plate 135 in engagement with the face 142. This in turn retracts the cable 100 so that the biasing of the pawl 68 by the spring 106 is removed. The pawl 68 will then drop and disengage from the teeth 66 upon movement of rod 58 via the foot pedal E, returning the brake system to normal operation.

Figure 6:
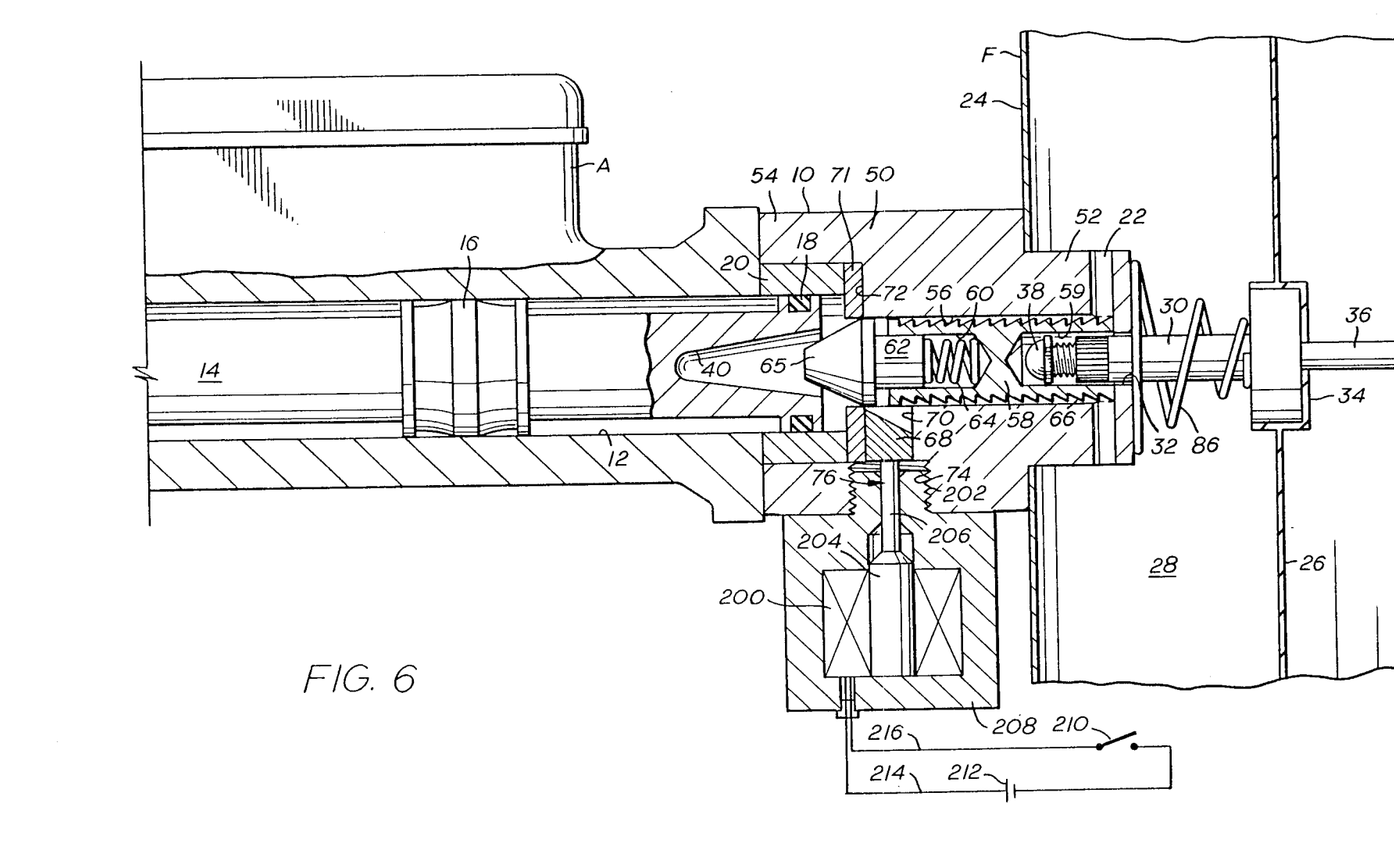
FIG. 6 is a side sectional view of an alternate embodiment of a brake locking mechanism of the present invention, shown in the locked position.
Figure 7:
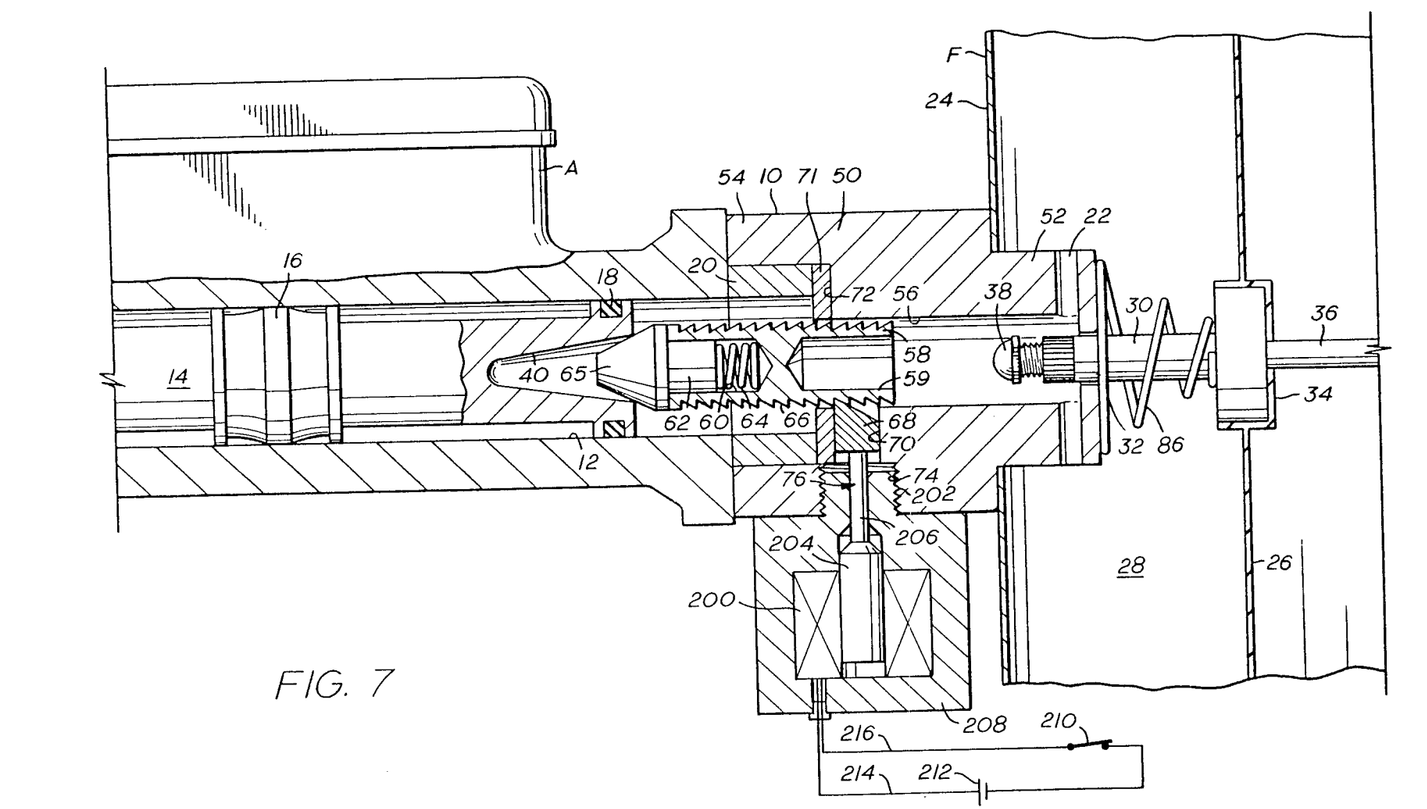
FIG. 7 is a side sectional view of the brake locking mechanism of FIG. 6, shown in the unlocked position.

In an alternate embodiment illustrated in FIGS. 6 and 7, the pawl 68 is engaged and disengaged electronically. A solenoid 200 is positioned at the bore 74 by, for example, threaded engagement of a solenoid nipple 202 therewith. The solenoid 200 is provided with a core 204 slideable therein and having a tapered portion 206 extending into the bore 74 adjacent the pawl 68. The solenoid 200 is desirably housed in a transverse extension 208 of the housing 50 in order to inhibit tampering therewith by unauthorized persons.

The solenoid 200 is operated by means of a switch 210 connected to a power source 212 and the solenoid 200 by means of wires 214,216. The wires 214,216 are desirably sheathed in a tamper-resistant sleeve (not shown). The switch 210 may be mounted on the dashboard of the vehicle passenger compartment or tied directly or by relay switches to the vehicle ignition switch. The switch 210 may also be operated by a key or combination lock as desired.

The locking mechanism of the present invention can be used to deter unauthorized use of the vehicle and/or as an emergency or parking brake. The mechanism is readily installed since the hydraulic brake fluid lines do not need to be broken for this purpose.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

I claim:

1. A brake locking mechanism for use with a hydraulic vehicle braking system having a master cylinder, with a reciprocable piston moveable between a brake applying position in which a hydraulic fluid is pressurized and a brake releasing position in which the hydraulic fluid is depressurized, and an actuator rod for reciprocating the master cylinder piston operable by a driver of the vehicle, comprising:
   (a) a housing adapted to fit between the actuator rod and the master cylinder;
   (b) means disposed in and concealed by the housing for reciprocating the master cylinder piston responsively to the operation of the actuator rod between said brake applying and releasing pistons; and
   (c) means concealed by the housing for releasably locking said reciprocating means with the master cylinder piston in the brake applying position, thereby rendering said reciprocating means nonresponsive to the operation of the actuator rod.

2. The mechanism of claim 1, wherein said reciprocating means is a rod slidably positioned in a bore formed in the housing.

3. The mechanism of claim 2, wherein said locking means is operable to engage said reciprocating rod and prevent movement thereof from the brake applying position.

4. The mechanism of claim 3, wherein said reciprocating rod is ratcheted and said locking means includes a pawl engageable with the ratchet.

5. The mechanism of claim 4, wherein said locking means includes remotely operable means for engaging and disengaging said pawl in and from said ratchet, respectively.

6. The mechanism of claim 5, wherein said remotely operable means is operable from a driver's compartment of the vehicle.

7. The mechanism of claim 6, wherein said remotely operable means comprises a barrel lock in a lock housing and a cable having one end attached to the lock in the lock housing and another end operatively positioned to engage said pawl in said ratchet.

8. The mechanism of claim 7, further comprising a sleeve for said cable.

9. The mechanism of claim 6, wherein said remotely operable means comprises a solenoid operatively associated with said pawl and a switch for operating said solenoid mounted in the driver's compartment.

10. The mechanism of claim 6, wherein said remotely operable means is unlockable with a key.

11. The mechanism of claim 6, wherein said remotely operable means includes a combination lock.

12. A brake locking mechanism for use with a hydraulic vehicle brake system having a master cylinder with a piston reciprocable between a brake applying position in which a hydraulic fluid is compressed and a brake releasing position in which the hydraulic fluid is depressurized, and an actuator rod in an actuator housing for reciprocating the piston operable by a driver of the vehicle, comprising:
   (a) a lock housing having first and second ends adapted to register with the actuator housing and master cylinder, respectively, to fit securely therebetween;
   (b) a longitudinal bore formed through the lock housing;
   (c) a ratcheted rod slideable in the longitudinal bore and adapted to reciprocate the piston responsively to urging of the actuator rod;
   (d) a pawl concealed within said lock housing and positioned adjacent the longitudinal bore to releasably engage the ratcheted rod; and
   (e) remotely operable means for engaging the pawl with the ratcheted rod with the ratcheted rod positioned to engage the piston in the brake applying position, thereby rendering release of the piston nonresponsive to the actuator rod, and for disengaging the pawl from the ratcheted rod, thereby returning the brake system to normal operation.

13. The mechanism of claim 12, wherein the ratcheted rod has a centrally disposed longitudinal bore for receiving an end of the actuator rod in engagement therewith.

14. The mechanism of claim 12, wherein the push rod is spring-biased to maintain engagement thereof with a reaction disk in the actuator.

15. The mechanism of claim 12, wherein the ratcheted rod has a centrally disposed longitudinal bore receiving a spring-biased pin having a head in engagement with the piston.

16. The mechanism of claim 12, wherein the remotely operable means comprises a cable in a sleeve extending from a transverse bore in the lock housing to a barrel lock mounted in a driver's compartment of the vehicle.

17. The mechanism of claim 16, wherein a spring is interposed between the cable and the pawl in the transverse bore.

18. The mechanism of claim 12, wherein the remotely operable means comprises a solenoid operatively associated with the pawl and a switch for supplying power to the solenoid mounted in a drivers compartment of the vehicle.

19. The mechanism of claim 18, wherein the switch is operatively associated with a vehicle ignition switch.

* * * * *